(12) United States Patent
Arslan et al.

(10) Patent No.: US 12,413,354 B2
(45) Date of Patent: Sep. 9, 2025

(54) CLUSTER BASED MULTIPLEXING OF RADAR AND COMMUNICATION SIGNALS IN MM-WAVE BAND

(71) Applicant: ISTANBUL MEDIPOL UNIVERSITESI, Istanbul (TR)

(72) Inventors: Hüseyin Arslan, Istanbul (TR); Saira Rafique, Istanbul (TR); Shaima' Abidrabbu, Istanbul (TR); Musab Alayasra, Istanbul (TR)

( * ) Notice: Subject to any disclaimer, the term of this patent is extended or adjusted under 35 U.S.C. 154(b) by 315 days.

(21) Appl. No.: 18/255,515

(22) PCT Filed: Dec. 16, 2021

(86) PCT No.: PCT/TR2021/051427
§ 371 (c)(1),
(2) Date: Jun. 1, 2023

(87) PCT Pub. No.: WO2022/132112
PCT Pub. Date: Jun. 23, 2022

(65) Prior Publication Data
US 2024/0007240 A1    Jan. 4, 2024

(30) Foreign Application Priority Data
Dec. 17, 2020 (TR) ................. 2020/20798

(51) Int. Cl.
| | | |
|---|---|---|
| H04L 25/02 | (2006.01) |
| G01S 7/00 | (2006.01) |
| G01S 7/02 | (2006.01) |
| H04B 7/0408 | (2017.01) |
| H04B 7/06 | (2006.01) |
| H04L 5/00 | (2006.01) |

(52) U.S. Cl.
CPC ............ *H04L 5/0023* (2013.01); *G01S 7/006* (2013.01); *G01S 7/0236* (2021.05); *H04B 7/0408* (2013.01); *H04B 7/0697* (2013.01)

(58) Field of Classification Search
CPC ............ G01S 2013/9316; G01S 7/006; G01S 7/0233; G01S 7/0236; G01S 7/42; H04B 7/0408; H04B 7/0617; H04B 7/0697; H04L 5/0023
See application file for complete search history.

(56) References Cited

FOREIGN PATENT DOCUMENTS

| | | | | |
|---|---|---|---|---|
| KR | 20230058512 A | * | 5/2023 | ........... H04B 7/0617 |
| WO | WO-2020173627 A1 | * | 9/2020 | ........... H04B 7/0417 |

OTHER PUBLICATIONS

International Search Report for corresponding PCT/TR2021/051427 dated May 9, 2022.
Written Opinion of the International Searching Authority for corresponding PCT/TR2021/051427 dated May 9, 2022.
(Continued)

*Primary Examiner* — Phuc H Tran
(74) *Attorney, Agent, or Firm* — Egbert, McDaniel & Swartz, PLLC

(57) ABSTRACT

Disclosed is a novel method proposed for Radar and Communication coexistence in the mm Wave band by exploiting channel sparsity which is described by the geometrical channel model. The joint transmitter and receiver in bistatic broadcast joint radar and communication (JRC) system have multiple collocated antennas.

3 Claims, 3 Drawing Sheets

(56) References Cited

OTHER PUBLICATIONS

Figure 1:
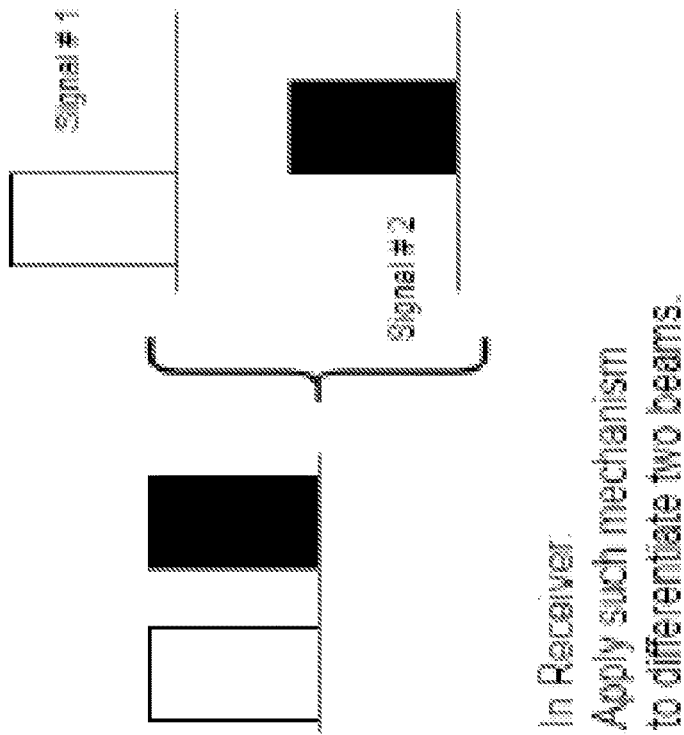

El Ayach, O., Rajagopal, S., Abu-Surra, S., Pi, Z., & Heath, R. W. (2014). Spatially sparse precoding in millimeter wave MIMO systems. IEEE transactions on wireless communications, 13(3), 1499-1513.

Gustafson, C., Haneda, K., Wyne, S., & Tufvesson, F. (2013). On mm-wave multipath clustering and channel modeling. IEEE Transactions on Antennas and Propagation, 62(3), 1445-1455.

Buzzi, S., & D'Andrea, C. (2016). On clustered statistical MIMO millimeter wave channel simulation. arXiv preprint arXiv:1604.00648.

* cited by examiner

CLUSTER BASED MULTIPLEXING OF RADAR AND COMMUNICATION SIGNALS IN MM-WAVE BAND

TECHNICAL FIELD

In this invention; a novel method is proposed for Radar and Communication coexistence in the mm Wave band by exploiting channel sparsity which is described by the geometrical channel model. The joint transmitter and receiver in bistatic broadcast joint radar and communication (JRC) system consists of multiple collocated antennas.

PRIOR ART

Both systems utilize the same frequency and band and are transmitting at the same time. When the Tx antennas transmit multiple narrow beams; then for each beam channel behaves differently. Multiple narrow beams are transmitted because it is assumed that the channel is sparse-scattering. Each narrow beam faces different scatterers in the channel and these scatterers reflect the incident beam in different directions (angles). The receiver; receives multiple clusters that are totally independent or semi-independent. These received clusters are resolvable at the receiver and therefore communication and radar beams can be separated. Digital beamforming or hybrid beamforming is exploited to multiplex radar and communication beams into the channel.

More specifically, the angular domain is used to actualize radar and communication coexistence in the mm Wave band through multiplexing of two independent signals (Radar and Communication) in the channel.

Technical Problems Causing the Invention and Reasons:
6G wireless communication offers several applications such as V2V (vehicular communication systems) communication that require both sensing and communication capability. Moreover; ever increasing number of applications and users; and demand for increased data rates has given rise to the issue of spectrum scarcity. These challenges has pushed the scientific community to develop a framework for joint sensing and communication that can use common spectral and hardware resources [1]. Spectrum sharing is critical because wireless spectrum is limited and by using wider bandwidths both communication and sensing functionalities can enhance.

Several techniques have been discussed in the literature to realize Joint Radar and Communication Systems [2]. These are coexistence and co-design. In coexistence approach both radar and communication sub-systems operate independently. However; the main concern in this approach is the interference between radar and communication systems. In co-design also known as Dual Function Radar Communication (DFRC); radar and communication systems are jointly designed. Joint waveform design is one of the focus of DFRC system in which a single emission is used for both sensing and sending. However; in this approach radar or communication functionality is compromised based on the fact whether the waveform is communication-centric or radar-centric.

All these factors lead to this invention where both communication and radar signals operate independently with the ability to get separated from each other at the receiver without causing interference.

Since both signals are being transmitted via independent beams while sharing the same frequency and time; sensing and radar performance will be better as compared with the jointly designed JRC system with a common waveform.

The ever-deteriorating spectrum scarcity together with key emerging applications has imposed a complete rethink of the utilization of spectral resources between radar and communication systems [1]. During the past few decades, both radar and communication systems have been deployed worldwide, spreading all over the spectrum from microwave to millimeter-wave (mm-Wave) bands. Conventionally, most of the commercial communication systems are accommodated in the sub-6 GHz band, which are expected to achieve harmonious coexistence with a variety of existing radar systems [1], [2].

More recently, however, the mm-Wave spectrum has been made accessible for 5G deployment, to leverage the large bandwidth resources available. This further leads to increased congestion of the frequency spectrum in conjunction with the existing radar residents in this band [1], [2]. To exploit the under-utilized radar spectrum resources for wireless communication, both industry and academia have been looking towards radar-communication spectrum sharing, which has now attracted significant research interest and investment.

In the literature, there are several deployment mechanisms to implement "Joint Radar and Communications". These mechanisms are Coexistence and Co-design [3]. On one hand, the Co-design approach focuses on designing a single waveform that is capable of performing both sensing and sending functionalities. This normally referred to as dual-functional radar-communication (DFRC), stands for a paradigm change where the previously competing radar and communication transmissions can be jointly designed, via the shared use of a single hardware platform and a joint signal processing framework. DFRC is envisioned as the key enabler for several emerging applications, including vehicular networks, indoor positioning as well as drone networks [1]. Recent experiments validated the superposition of data in the chirp subcarrier of the multi-carrier waveform using the Fractional Fourier Transform (FrFT) [4]. But designing a common single waveform might add some complexity in implementation and detection processes to achieve good performance for both wireless and radar communication. As well as the Co-design approach might bring high-cost efficiency and new hardware implementation.

On another hand, in the coexistence scenario, both radar, and communication systems independently or semi-independently exist sharing the same spectral resources. However, because of sharing the same frequency band, radar and communication systems cause interference with each other. This interference can be controlled if we are using orthogonal and highly orthogonal signals. As a step beyond simply sharing the spectrum, the integration between wireless communication and the radar sensing functionalities is highly sought after. It brings considerable gains in terms of spectral, energy, hardware, and cost-efficiency. All these gains actualized by exploiting and utilizing what we have in both parties to reach a fair level of coexistence in the shared band. Our invention is based on the coexistence approach.

Aims of the Invention and Brief Description

The present invention is related to a method for cluster based multiplexing of radar and communication signals in mm-wave band in order to eliminate the disadvantages mentioned above and to bring new advantages to the related technical field.

In the coexistence scenario between radar and communication, both subsystems operate independently while sharing the same spectral resources. The proposed technique is based on exploiting channel sparsity to spatially multiplex radar and communication signals without introducing additional design complexity as in case of waveform-based or hardware-based JRC approaches. Therefore; this invention provides spectral and energy efficiency, cost-efficiency without any hardware complexity. With this capability, the proposed solution has the potential to gain huge interest from both academic and industrial circles.

The purpose of this invention is to achieve coexistence of radar and communication systems without any additional complexity and with enhanced signal separability at the receiver. The proposed method achieves these goals by exploiting channel sparsity which is well explained by geometric channel model. The coexistence JRC approach revolves around mechanisms to reduce interference between radar and communication signals. By allocating some clusters in the environment for communication and using other angular locations for radar; we can successfully separate radar and communication signals at the receiver. The JRC receiver has the ability to trace that which transmitted beam is associated with a particular cluster and in this way both communication and radar signals are separated at the receiver.

In waveform-based joint design JRC systems; a single emission is optimized to perform simultaneous sensing and sending. Talking about the space domain; authors in [2] tried to modulated side lobes of the radar beam with communication signals. However; in this approach throughout of the communication system is low. Similarly; OFDM based JRC systems [7] are incapable of high-resolution radar imaging.

In contrast with the above mentioned methods; the proposed JRC system performs both reliable sensing and communication features via multiple transmission of independent narrow beams. In conclusion; in the invention, two Eigen channels are created; one for communication and other for radar.

1. Transmission of multiple independent narrow beams (Radar and Communication beams) in the mm-wave band which result in receiving multiple clusters or rays of multipath components at the receiver.
2. Identification of these multipath components i.e. successful resolvability of received reflected rays at the receiver.
3. Communication and Radar signals' separability in space domain.
4. No additional hardware complexity.
5. Reduced interference
6. Spectrum efficiency
7. Achieving reliable sensing and communication performance.

The proposed method for coexistence between the radar and wireless communications in mm-wave band can be extended to industrialization. In this method; JRC coexistence is achieved by exploiting the sparsity characteristic of the mmWave channel. The receiver has the ability to identify and differentiate radar and communication signals as they arrive at different angles and therefore; decrease interference between them. Furthermore, the proposed solution brings considerable gains in terms of spectral, energy, hardware, and cost efficiency. Thus, both industry and academia can take benefit from this invention.

Moreover, applications such as V2V communication, automotive radars with collision avoidance, and high-resolution imaging radars, can take benefit from this invention. In addition to these, 5G New radio, and 802.11 ad/ay WLAN protocols from a wireless communication perspective

DEFINITION OF THE FIGURES

The figures have been used in order to further disclose a method for cluster based multiplexing of radar and communication signals in mm-wave band developed by the present invention which the figures have been described below:

FIG. 1: Multiplexing radar and wireless communications over the channel
FIG. 2: System Model
FIG. 3: Multi-transmission beams that used in the invention

DETAILED DESCRIPTION OF THE INVENTION

The novelty of the invention has been described with examples that shall not limit the scope of the invention and which have been intended to only clarify the subject matter of the invention. The present invention has been described in detail below.

System Model:

In invention, independent radar and communication signals are used. The independence here means that the generation of the signals has been done without any influence or control from each other. For instance, in [1] OFDM (Orthogonal Frequency Division Multiple Access) waveform is used for communication and FMCW (Frequency Modulated Continuous Wave) signal is transmitted is used for radar sensing. Both signals are transmitted via different transmitters while sharing the same channel. The communication signal is used to send information with high throughput whereas radar waveform is transmitted to gain information about the targets in the environment. Both signals exist peacefully in the channel performing their designated tasks for the applications that require both radar sensing and communication. More specifically, based on the literature, invention has two types of JRC systems. The first one is coexistence in which radar and communication systems operate independently while sharing the same channel. The main focus in this approach is avoidance of mutual interference between the two systems. This case is our scope in this invention. The other one is co-design signals where the JRC signals are designed in a specific way it could be dependent on each other. In particular, a single waveform is optimized for both sensing and communication and this waveform is transmitted via single transmitter that is shared by both radar and communication systems.

Since both communication and radar signals are transmitted independently and they (radar and communication signals) pass through the same channel, hence the channel is referred as the shared channel between radar and communication signals. Both Tx and Rx have multiple collocated antennas therefore, beamforming is used to transmit radar and communication beams. When the number of Tx and Rx antennas is large, then the beams are narrow and orthogonal to each other which also implies that the interference among the clusters is limited. Multiple Tx antennas send multiple orthogonal narrow beams into the shared channel in the mmWave band via digital beamforming.

In this invention, multi-beam transmission is done through the shared channel in mm Wave band between the radar and communication signals by exploiting digital beamforming and spatial multiplexing techniques. In particular, radar and communication signals are multiplexed into the channel by using beam-space multiplexing which sufficiently utilizes the advantages of both beamforming and spatial multiplexing. With beamforming techniques, the beam patterns of transmit and receive antenna array can be steered in several desired directions (i.e., desired angles). Based on steering stage, selection of desired angles is done for radar and communication. Moreover, spatial multiplexing based on beamformed spatial channel enables multiple activated networks or in other words eigen channels (radar and communications), which is exploited here in this invention.

Figure 2:
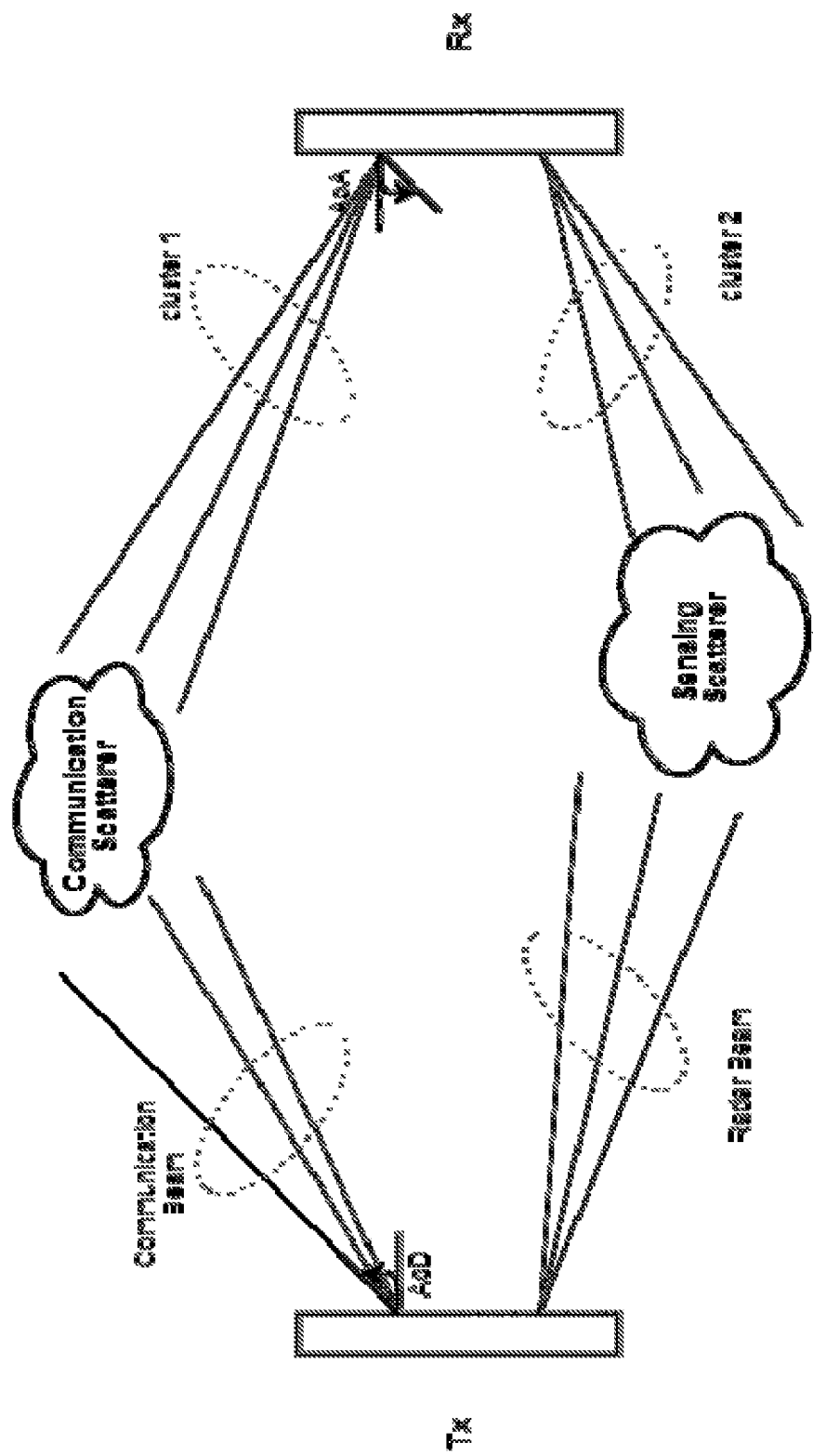
Figure 3:
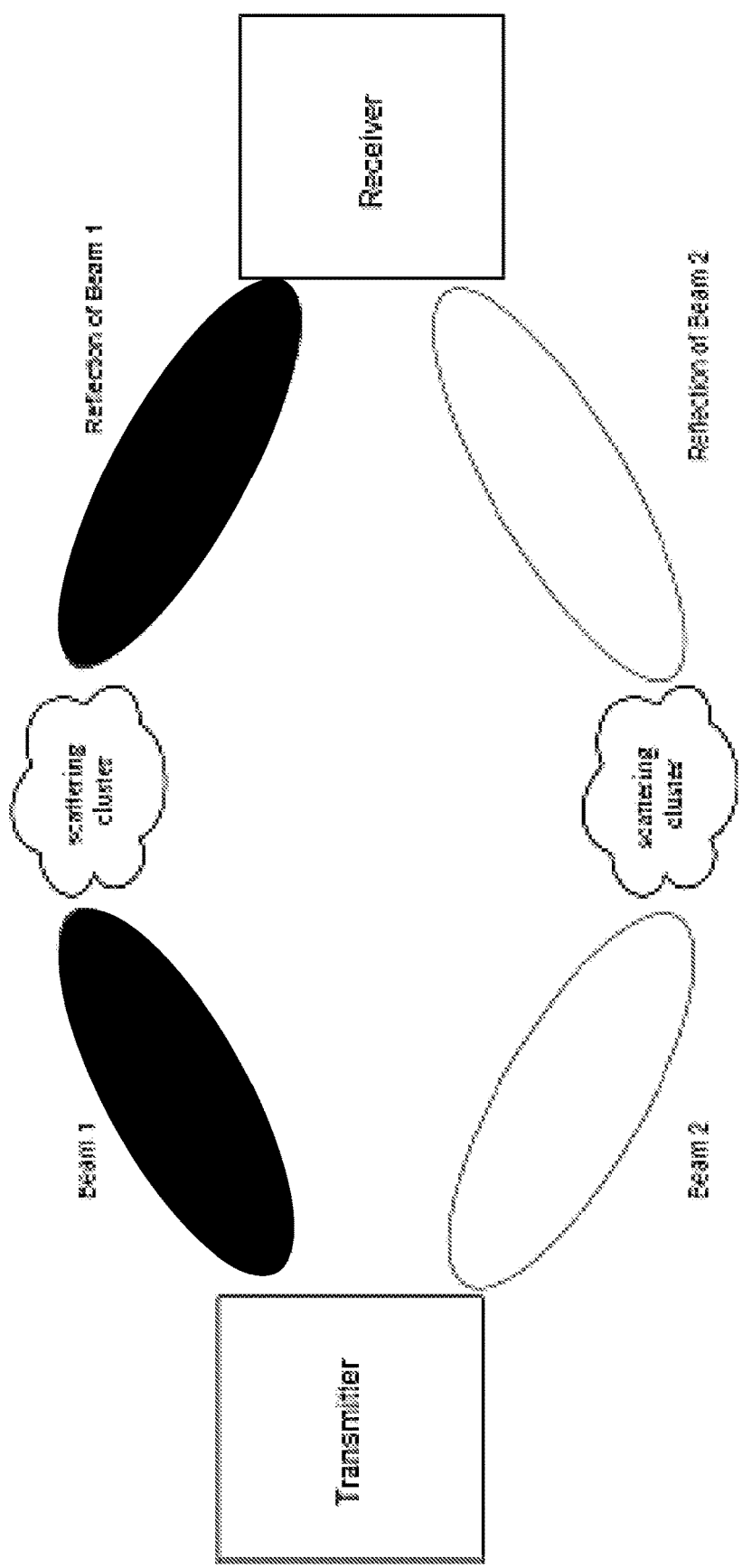

In this invention, a novel method is proposed to spatially multiplex two technologies i.e., radar and communication in the channel by allocating some clusters in the environment for communication signals while allocating other angular locations for radar signals. As illustrated in FIG. 2, the system model consists of a shared Tx and Rx between radar and communication systems. Both Tx and Rx have multiple collocated antennas. It is assumed that the channel is sparse scattering. The channel has five parameters i.e., azimuth and elevation angle of arrival (AoA) ($\theta^r$, $\varphi^r$), azimuth and elevation angle of departure (AoD) ($\theta^t$, $\varphi^t$), channel complex coefficient $\alpha$, time delay $\tau$ and Doppler shift $v$. Such a channel model can be represented by spatial MIMO channel model which is the main geometric channel model and is described in [12]. For $N_t$ transmit antennas and $N_r$ receive antennas, let the channel consists of $N_{cl}$ clusters and the lth cluster contains $L_l$ rays such that $N_p = E_{i=1}^{N_{cl}} L_l$, then the channel is equated as [8]: the sparse channel equation is represented by the following equation:

$$H(t,f) = \sqrt{\frac{N_t N_r}{N_p}} \sum_{l=1}^{N_{cl}} \sum_{i=1}^{L_l} \alpha_{l,i} a_r(\theta_{l,i}^r, \varphi_{l,i}^r) a_t^H(\theta_{l,i}^t, \varphi_{l,i}^t) e^{j2\pi v_{l,i} t} e^{-j2\pi \tau_{l,i} f}$$

When the number of transmit and receive antennas ($N_t$, $N_r$) are large, then the beams are narrow and are orthogonal to each other. This also indicates that the interference among the scattering clusters is limited [9].

The transmitter is transmitting radar and communication signal beams at the same time, using the same frequency and the same band. In this idea, it is intended to spatially multiplex two beams i.e., radar and communication signals into the channel and separate them at the receiver. The main motivation of this invention is to avoid mutual interference between radar and communication signals in JRC coexistence approach. Instead of dealing with the interference of both technologies in time and frequency domain; they are separated in the space domain.

This process is demonstrated in FIG. 1. The multibeam (radar and communication) transmission results in receiving multiple clusters or rays of multipath components. These clusters can be either orthogonal or partially orthogonal.

It is assumed that the AoA and AoD for the communication signals are known at both the receiver and the transmitter by estimating the uplink channel using some estimation techniques [1] and the downlink channel is assumed to be known due to angle reciprocity property in these frequency bands which gives the system ability to enable the TDD and the FDD multiplexing mode. For channel estimation, it is assumed that the signals are sent over same time-frequency resources while they are separated in the angular domain. Based on that, each beam is transmitted over different angle. These angles are assumed to be totally orthogonal with each other to remove the interference effect. The orthogonality of the angles can be achieved by employing large number of antenna elements in the system.

To start the connection, first the communication beams are transmitted and are received at specific angles due to the sparsity of the channel. After that, by exploiting the sparse nature of the channel [10, 11], the receiver can identify the unused angles and inform the transmitter with a feedback to transmit the sensing beams over them. Then, the estimation process can be continued. The gain of channel at each path for each beam is referred to a unique scatterer. The scatterer is defined using specific characteristics including gain, incidence and reflected angles. Here we assume that the gain of each path is equal to the scatterer gain. Furthermore, the scatterers associated with communication beams are referred to communication scatterers while the scatterers associated with the sensing beams are referred to sensing scatterers. This is identified at the receiver side.

Assume a narrowband channel with multiple beams transmitters/receivers, where the channel is assumed fixed during beam transmission. As mentioned earlier, a geometrical design is modeled for the channel, only three parameters (AoA, AoD, channel gain) are the main focus here since the channel is assumed narrowband. When multiple narrow beams are transmitted into different direction with specific AoD, each transmitted beam faces unique scatterer(s), in particular, each beam encounters different scatterers and gets reflected at a particular angle. These different reflected angles are exploited to multiplex radar and communication signals into the channel. This is explained in FIG. 3. Actually, the invention has scattering clusters in the environment, their locations and numbers are fixed and depend on the environment. Each scattering cluster has scatterers within. Each scattering cluster is responsible for a cluster of rays reflected to the receiver. The receiver is able to identify these clusters and trace that which beam, and scatterer is contributing to a particular cluster. Therefore, through the cluster resolvability ability of the receiver radar and communication signals can be successfully separated.

For cluster identification and resolvability several other techniques can also be used. Cluster identification based on specific features for communication and radar signals can be actualized by exploiting machine learning techniques such as blind signal identification. These specific features can be modulation type, bandwidth and/or power level.

Frequency Modulated Continuous Waveform (FMCW) is used for radar sensing and Orthogonal Frequency Division Multiplexing (OFDM) is used for communication beams.

A method of cluster based multiplexing of radar and communication signals in mm-wave band comprising scattering cluster which is responsible for a cluster of rays reflected to the receiver, shared transmitter (Tx) which is transmitting radar and communication signal beams at the same time; using the same frequency and the same band, and receiver (Rx) wherein multiplex two beams are separated between radar and communication systems and identified clusters and beams.

A method of cluster-based multiplexing of radar and communication signals in mm-wave band comprising steps of;
  i. Transmitting of radar and communication signals independently and passing through the same channel via different transmitters,
  ii. Using of multi beamforming for transmitting of radar and communication signals through the shared channel in mm Wave based on digital beamforming and spatial multiplexing techniques,
  iii. Performing of channel modeling and estimation process by;
    Sending of signals over the same time frequency resources for estimation although signals are separated in angular domain, transmitting of each beam over different angle,
    Transmitting of communication beams for starting of connection, Receiving of communication beams at specific angles due to the sparsity of the channel,
Using of the sparse channel equation as $$H(t,f) = \sqrt{\frac{N_t N_r}{N_p}} \sum_{l=1}^{N_{cl}} \sum_{i=1}^{L_l} \alpha_{l,i} a_r(\theta_{l,i}^r, \varphi_{l,i}^r) a_t^H(\theta_{l,i}^t, \varphi_{l,i}^t) e^{j2\pi v_{l,i}t} e^{-j2\pi \tau_{l,i}f},$$

By exploiting the sparsity of the channel, identifying of the unused angles by the transmitter and informing of the transmitter with a feedback to transmit the sensing beams over them,
Using of scatters,
Transmitting of multiple beams,
Encountering of each beam with different scatterers and getting reflected at a particular angle,
Exploiting of different reflected angles to multiplex radar and communication signals into the channel,
iv. Receiving of multiple clusters in the receiver and using of the third step to make the cluster resolvable.

REFERENCES

[1] Liu, Fan, et al. "Joint radar and communication design: Applications, state-of-the-art, and the road ahead." IEEE Transactions on Communications (2020).
[2] Hassanien, Aboulnasr, et al. "Dual-function radar communication systems: A solution to the spectrum congestion problem." IEEE Signal Processing Magazine 36.5 (2019): 115-126.
[3] Mishra, Kumar Vijay, et al. "Toward millimeter-wave joint radar communications: A signal processing perspective." IEEE Signal Processing Magazine 36.5 (2019): 100-114.
[4] Hassanien, Aboulnasr, et al. "A dual-function MIMO radar-communication system via waveform permutation." Digital Signal Processing 83 (2018): 118-128.
[5] Huang, Tianyao, et al. "MAJoRCom: A dual-function radar communication system using index modulation." IEEE Transactions on Signal Processing (2020).
[6] Hassanien, Aboulnasr, et al. "Dual-function radar-communications: Information embedding using side lobe control and waveform diversity." IEEE Transactions on Signal Processing 64.8 (2015): 2168-2181.
[7] Sur, Samarendra Nath, et al. "OFDM Based RADAR-Communication System Development." Procedia Computer Science 171 (2020): 2252-2260.
[8] Heath, Robert W., et al. "An overview of signal processing techniques for millimeter wave MIMO systems." IEEE journal of selected topics in signal processing 10.3 (2016): 436-453.
[9] Ding, Yacong, et al. "Spatial scattering modulation for uplink systems." IEEE Communications Letters 21.7 (2017): 1493-1496.
[10] Lee, Junho, Gye-Tae Gil, and Yong H. Lee. "Exploiting spatial sparsity for estimating channels of hybrid MIMO systems in millimeter wave communications." 2014 IEEE global communications conference. IEEE, 2014.
[11] Deng, Hua, and Akbar Sayeed. "Mat-wave MMO channel modeling and user localization using sparse beamspace signatures." 2014 IEEE 15th International Workshop on Signal Processing Advances in Wireless Communications (SPAWC). IEEE, 2014.
[12] Heath, Robert W., et al. "An overview of signal processing techniques for millimeter wave UFMO systems." IEEE journal of selected topics in signal processing 10.3 (2016): 436-453.

The invention claimed is:

1. A method for cluster-based multiplexing of radar and communication signals in an mm-wave band, the method comprising:
    transmitting the radar and communication signals independently through a common channel via different transmitters;
    multi-beam forming the transmitted radar and communication signals in the mm-wave by digital beam forming and spatial multiplexing;
    performing channel modeling and estimation by the steps of:
        sending the radar and communication signals over a common time frequency resource for estimation, the sent radar and communication signals being angularly separated such that each beam is transmitted over a different angle;
        transmitting communication beams by a transmitter so as to start a connection;
        receiving the transmitted communication beams at specific angles;
        applying a channel equation to the received communication beams;
        identifying unused angles by the transmitter; and
        informing the transmitter with a feedback so as to transmit sensing beams over the unused angles;
    transmitting multiple beams;
    encountering each of the multiple beams with different scatterers so as to reflect at an angle;
    using the different reflected multiple beams so as to multiplex the radar and communication signals into the common channel; and
    receiving multiple clusters in a receiver in order to perform the step of performing channel modeling and estimation.
2. The method of claim 1, wherein the multiple clusters are orthogonal.
3. The method of claim 1, wherein the multiple clusters are partially orthogonal.

* * * * *